(No Model.)
F. W. FLYNN.
AXLE BEVEL.
No. 299,771.	Patented June 3, 1884.
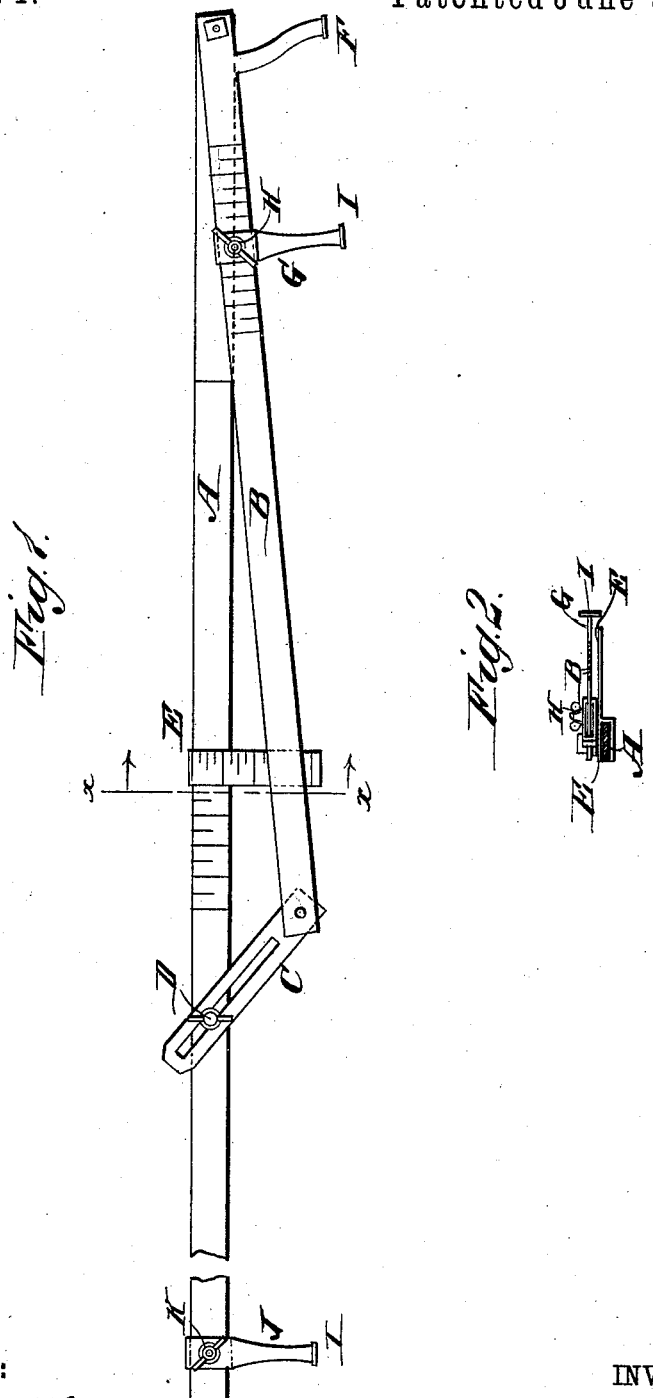
WITNESSES:
INVENTOR:
BY Munn & Co
ATTORNEYS.

UNITED STATES PATENT OFFICE.

FRANCIS WILLIAM FLYNN, OF WOODSTOCK, CONNECTICUT.

AXLE-BEVEL.

SPECIFICATION forming part of Letters Patent No. 299,771, dated June 3, 1884.

Application filed April 17, 1884. (No model.)

*To all whom it may concern:*

Be it known that I, FRANCIS WILLIAM FLYNN, of Woodstock, in the county of Windham and State of Connecticut, have invented a new and Improved Axle-Bevel, of which the following is a full, clear, and exact description.

The object of my invention is to provide a convenient and accurate instrument for setting and truing axles, giving the required set and gather, according to the diameter and dish of the wheel.

My invention consists in the construction and arrangement of parts, as will be hereinafter described, and specifically set forth in the claim.

Reference is to be had to the accompanying drawings, forming part of this specification, in which similar letters of reference indicate corresponding parts in both the figures.

Figure 1 is a side elevation of my improved axle-bevel, and Fig. 2 is a transverse section taken on line $x\ x$ in Fig. 1.

To one end of a bar, A, is pivoted a bar, B, which is jointed at its free end to a slotted bar, C, extending across the face of the bar A, and receiving in its slot the clamping-screw D, extending from the said bar A, and by which the bar B may be secured in any desired position relative to the bar A. The bar B is equal in length to the radius of the largest wagon-wheel, and the bar A is graduated a portion of its length for convenience in setting the movable scale E at a distance from the pivot of the bar B representing the semi-diameter of the wheel belonging to the axle to be set. The scale E is capable of sliding on the bar A, and it projects from the said bar at right angles and extends under the bar B. The graduations on the scale E represent inches and parts of inches. The bar B has a fixed arm, F, projecting from its edge near its pivot, and a movable arm, G, of the same length as the arm F, is mortised to receive the bar B, and is adjustable along the length of the said bar. The arm G is clamped in any desired position by the screw H, and is provided with a T-head, I, to give it an increased bearing-surface on the axle. On the end of the bar A opposite the pivot of the bar B is placed an arm, J, of the same length as the arms F G, and provided with a T-head, I. The arm J is mortised to receive the bar A, and is provided with a clamping-screw, K, by which it may be secured in any desired position on the bar A.

In use, the scale E is placed on the bar A at a distance from the pivot of the bar B corresponding with the semi-diameter of the wheel whose axle is to be set. The bar B is then adjusted by the scale E at an angle with the bar A, which represents the dish of the wheel, and the said bar B is clamped in this position by the engagement of the screw D with the slotted bar C. The arm F is brought into contact with the end of the arm of the axle to be set, and the arm G is placed on the axle-arm near the collar. The arm J is adjusted on the bar A, so that when the instrument is applied to an axle and the arm G properly adjusted relative to one of the axle-arms the arm J will touch the other axle-arm near the collar thereof. When the instrument is adjusted in the manner described, the axle is heated and bent to conform to the angle formed by a line drawn through the ends of the arms F G J. The instrument may be used in the same manner to gage the angle of the axle-arm for the gather of the wheel.

By means of my improved bevel the arms of an axle may be accurately bent to any desired angle without the trouble of making careful measurements.

Having thus described my invention, what I claim as new, and desire to secure by Letters Patent, is—

The improved axle bevel or gage herein described, consisting of the bar A, provided at one end with a sliding arm, J, and its clamp-screw K, sliding gage E near its center, bar B, pivoted to the opposite end of bar A from the arm J, and provided near its pivoted end with a fixed arm, F, a sliding arm, G, and clamp-screw H, and with a pivoted slotted arm, C, at its free end, and a clamp-screw, D, connecting the slotted arm with the bar A, substantially as shown and described.

FRANCIS WILLIAM FLYNN.

Witnesses:
JOHN A. CARPENTER,
SETH STODDARD.